(12) United States Patent
Garcia et al.

(10) Patent No.: US 9,737,963 B2
(45) Date of Patent: Aug. 22, 2017

(54) PIVOTING TOOL FOR POSITIONING AUTOMOTIVE COMPONENTS

(71) Applicant: METALSA S.A. DE C.V., Apodaca (NL)

(72) Inventors: Juan Villarreal Garcia, Saltillo (MX); Jason Belcher, Cecilia, KY (US); Marvin Lewis Adams, Elizabethtown, KY (US)

(73) Assignee: METALSA S.A. DE C.V., Apodaca (MX)

( * ) Notice: Subject to any disclaimer, the term of this patent is extended or adjusted under 35 U.S.C. 154(b) by 138 days.

(21) Appl. No.: 14/619,919

(22) Filed: Feb. 11, 2015

(65) Prior Publication Data

US 2015/0239128 A1    Aug. 27, 2015

Related U.S. Application Data

(60) Provisional application No. 61/944,013, filed on Feb. 24, 2014.

(51) Int. Cl.
*B23K 37/047* (2006.01)
*B23K 31/02* (2006.01)
(Continued)

(52) U.S. Cl.
CPC .............. *B23K 31/02* (2013.01); *B23K 31/12* (2013.01); *B23K 37/0229* (2013.01);
(Continued)

(58) Field of Classification Search
CPC .. B23K 9/126; B23K 15/0013; B23K 15/002; B23K 15/0026; B23K 26/0823;
(Continued)

(56) References Cited

U.S. PATENT DOCUMENTS 3,362,056 A    1/1968  Preller et al.
3,940,162 A    2/1976  Winslow et al.
(Continued)

FOREIGN PATENT DOCUMENTS

GB          1102410 A       2/1968
JP    WO 2013073683 A1 *  5/2013  ............ B25J 9/1682
(Continued)

OTHER PUBLICATIONS

International Search Report for International Application No. PCT/IB2015/000596, dated Oct. 5, 2015, 3 pages.
(Continued)

*Primary Examiner* — Michael McCullough
*Assistant Examiner* — Brendan Tighe
(74) *Attorney, Agent, or Firm* — Michael Best & Friedrich LLP

(57) ABSTRACT

A system for positioning and welding a bracket 30 to a mounting surface, such as a vehicle side rail 40, including using a pivoting tool 20 on a moveable arm 10 that allows the bracket 30 to pivot to minimize the gap between the bracket 30 and its intended mounting surface. The pivoting tool 20 secures, positions near the surface, and allows the bracket 30 to pivot for a precise surface match. A welder 50 welds the bracket 30 to the surface with the gap minimized while the bracket 30 is held in the desired position. The pivoting tool 20 is preferably on an adjustable appendage 12 or combination end 60 mounted on a distal end of the arm 10. The flexible tooling does not require the bracket 30 to be forced with substantial pressure against the mounting surface.

6 Claims, 4 Drawing Sheets

(51) Int. Cl.
*B25J 15/00* (2006.01)
*B23K 31/12* (2006.01)
*B23K 37/02* (2006.01)
*B23K 37/04* (2006.01)
*B25J 9/16* (2006.01)
*B23K 101/00* (2006.01)
*B23K 101/28* (2006.01)
*B23K 103/04* (2006.01)

(52) U.S. Cl.
CPC ........ *B23K 37/047* (2013.01); *B23K 37/0452* (2013.01); *B25J 9/1679* (2013.01); *B25J 15/0066* (2013.01); *B23K 2201/006* (2013.01); *B23K 2201/28* (2013.01); *B23K 2203/04* (2013.01); *B25J 9/1697* (2013.01); *Y10S 901/42* (2013.01)

(58) Field of Classification Search
CPC .............. B23K 26/083; B23K 26/0869; B23K 26/0876; B23K 26/0884; B23K 26/103; B23K 37/04; B23K 37/0452; B23K 37/047; B23P 19/10; B23P 19/102; B23P 21/00; B23P 21/002; B23P 2700/50; B23Q 1/4852; B23Q 1/525; B25J 9/1612; B25J 9/1697; B25J 13/088; B25J 13/089; B25J 15/0206; B25J 15/0213; B25J 15/0253; B25J 15/022; B25J 15/0226; B25J 15/0233; B25J 15/0266; B25J 15/0273; B25J 15/028; B25J 15/0286; B25J 17/0208; B25J 17/0233; B25J 17/0241; B25J 18/025; B25J 19/0096; B25J 19/021; B25J 19/023; B25J 15/0066; B60G 2206/604; B62D 65/02; B62D 65/024; Y10T 74/20329
USPC ............. 29/407.09, 407.1, 897.2; 74/490.03; 228/49.1; 414/732, 730
See application file for complete search history.

(56) References Cited

U.S. PATENT DOCUMENTS

| | | | |
|---|---|---|---|
| 4,611,749 A * | 9/1986 | Kawano | B23K 37/047 228/176 |
| 4,697,838 A | 10/1987 | Hartman | |
| 4,726,166 A | 2/1988 | DeRees | |
| 4,848,835 A | 7/1989 | DeRees | |
| 5,322,208 A | 6/1994 | Hinrichs et al. | |
| 5,380,978 A | 1/1995 | Pryor | |
| 6,010,155 A | 1/2000 | Rinehart | |
| 6,026,573 A | 2/2000 | Macchione | |
| 6,220,502 B1 | 4/2001 | Gallinger et al. | |
| 6,301,763 B1 | 10/2001 | Pryor | |
| 6,398,260 B1 | 6/2002 | Rinehart | |
| 6,398,262 B1 | 6/2002 | Ziech et al. | |
| 6,412,818 B1 | 7/2002 | Marando | |
| 6,422,604 B2 | 7/2002 | Lapic | |
| 6,477,774 B1 | 11/2002 | Marando et al. | |
| 6,488,791 B1 | 12/2002 | Power, II | |
| 6,513,242 B1 | 2/2003 | Christofaro et al. | |
| 6,525,294 B1 | 2/2003 | Kipping et al. | |
| 6,733,040 B1 | 5/2004 | Simboli | |
| 7,144,040 B2 | 12/2006 | Kiehl et al. | |
| 7,192,081 B2 | 3/2007 | Tijerina et al. | |
| 7,578,060 B2 | 8/2009 | Durand | |
| 7,614,151 B2 | 11/2009 | Miller | |
| 7,717,498 B2 | 5/2010 | Fleming | |
| 7,857,348 B2 | 12/2010 | Fleming | |
| 7,862,085 B2 | 1/2011 | Xu et al. | |
| 7,926,848 B2 | 4/2011 | Sherbeck et al. | |
| 8,485,555 B2 | 7/2013 | Hunt | |
| 2005/0044700 A1 | 3/2005 | Ghuman et al. | |
| 2009/0071281 A1 | 3/2009 | Fisk et al. | |
| 2012/0072021 A1 | 3/2012 | Walser et al. | |
| 2014/0061168 A1 | 3/2014 | Nakakura et al. | |
| 2014/0252807 A1 | 9/2014 | Medina et al. | |
| 2014/0309762 A1 * | 10/2014 | Hayata | B25J 9/1682 700/114 |

FOREIGN PATENT DOCUMENTS

| | | |
|---|---|---|
| WO | 9301080 A1 | 1/1993 |
| WO | 2006021679 A1 | 3/2006 |

OTHER PUBLICATIONS

Written Opinion of the International Searching Authority for International Application No. PCT/IB2015/000596, dated Oct. 5, 2015, 6 pages.
International Search Report for International Application No. PCT/IB2015/001036, dated Nov. 4, 2015, 2 pages.
Written Opinion of the International Searching Authority for International Application No. PCT/IB2015/001036, dated Nov. 4, 2015, 4 pages.
International Search Report for International Application No. PCT/IB2015/001096, dated Nov. 12, 2015, 2 pages.
Written Opinion of the International Searching Authority for International Application No. PCT/IB2015/001096, dated Nov. 12, 2015, 4 pages.

* cited by examiner

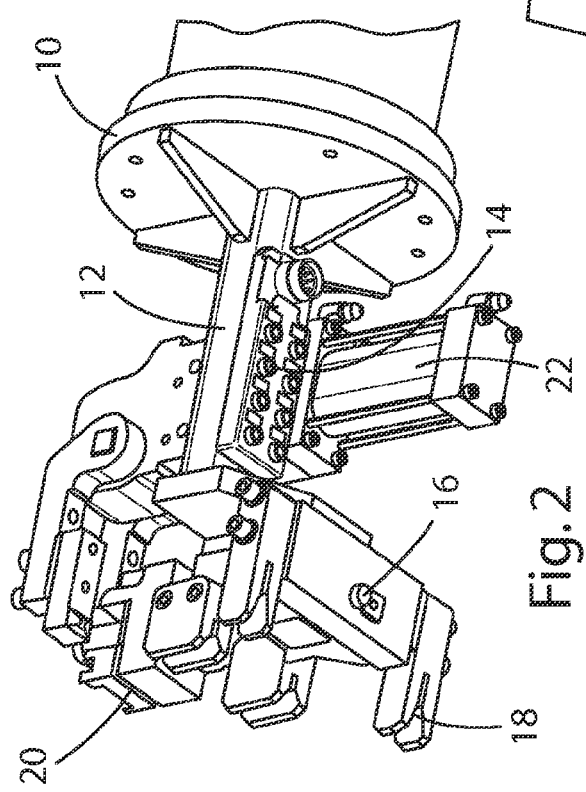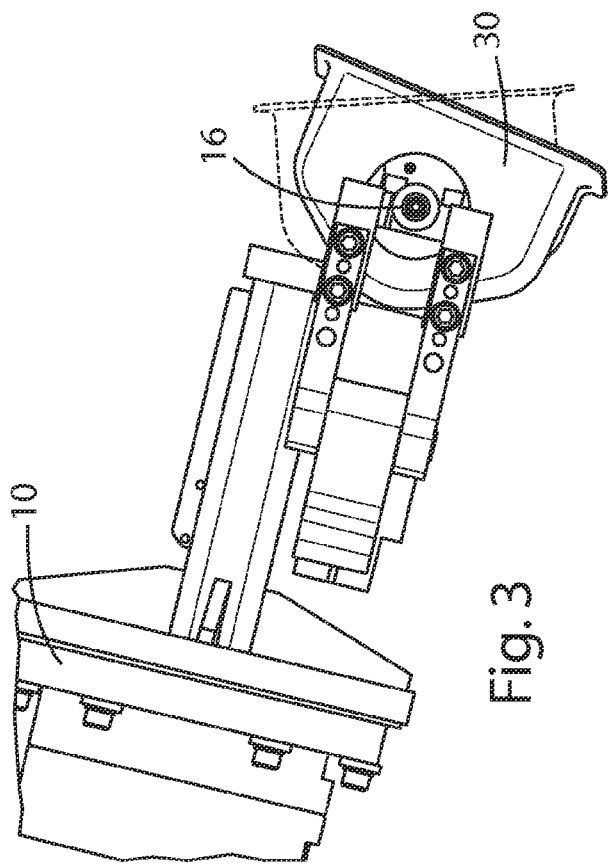

PIVOTING TOOL FOR POSITIONING AUTOMOTIVE COMPONENTS

CROSS-REFERENCE TO RELATED APPLICATION

This application claims priority to and all benefits of U.S. Provisional Application 61/944,013, filed on Feb. 24, 2014, entitled "Pivoting Tool for Positioning Automotive Components and Method Thereof", which is incorporated herein by reference.

FIELD OF THE DISCLOSURE

This disclosure relates to a pivoting tool and a positioning process, specifically, for placing an automotive component, such as a bracket, in a desired position before it is welded to a vehicle chassis frame.

BACKGROUND

In large welding operations, such as those present in the automotive industry, high flexibility operations are a significant concern. Flexibility is pursued by creating tools and operations that may be utilized for welding several different components and by simplifying the equipment and devices to be more versatile and less costly.

Many tooling efforts have been developed for creating more flexible welding operations regarding structural chassis frames, specifically, for those components that are attached to the main side rails, such as steel brackets. Welding operations usually demand specialty tools. In the case of the brackets, it is common practice to secure brackets in their desired position by using a lineal pneumatic arm, which keeps the bracket at the desired position by pressing the bracket into the component to which it will be welded. This less flexible tool is a dedicated fixed unique station that slides and then presses the bracket against the side rail.

In high volume welding operations, such as those present in the automotive industry, where several formed components proceed into welding processes, it is common to find variations in geometry of materials according to specification tolerances. To optimize the joining between components, the welding processes must guarantee that a variation within formed components does not affect the welding precision and therefore, it is common to make adjustment in the tooling placement.

Tools designed to place a component, such as a bracket, into a desired position by utilizing force, such as pneumatic force, are usually oversized and expensive tools.

The present disclosure describes a positioning tool to guarantee that an automotive component, such as bracket, is placed within a desired position without the need of utilizing oversized and costly specialty tooling.

SUMMARY AND OBJECTS OF THE DISCLOSURE

The present disclosure provides a pivoting tool characterized by being able to be attached to a robotic arm, wherein the tool has the ability to pivot and wherein such pivoting guarantees that the surface gap caused by geometric variations within tolerance, gets positioned wherein the welding operation is optimized.

The present disclosure is directed to decrease the space gap between the automotive component to be welded, such as a bracket, and the surface to where the component is to be welded, such as a vehicle chassis frame side rail.

In a preferred process, the pivoting tool from the present disclosure is attached to a robotic arm, wherein the robotic arm takes a bracket from a bracket pool. The robotic arm is then automated to place the bracket in a specific position on a vehicle side rail surface. The pivoting tool pivots automatically to guarantee that the gap between the bracket and the side rail is minimized. After the bracket position is optimized, a welding robot approaches the gap between the bracket and the side rail and welds both components together.

It is therefore an object of the present disclosure to provide a tool and a method that minimizes the gap between two components that are going to be welded together without the need to utilize force to guarantee positioning of the components.

BRIEF DESCRIPTION OF THE DRAWINGS

The above-mentioned and other features of this disclosure and the manner of obtaining them will become more apparent, and the disclosure itself will be best understood by reference to the following descriptions of tools and processes taken in conjunction with the accompanying figures, which are given as non-limiting examples only, in which:

FIG. 2 is a perspective view of the pivoting tool without a bracket on a robotic arm;

FIG. 3 is a top view of the pivoting tool showing pivoting of a bracket to adjust to surface changes that may be on the surface to which the bracket may be welded;

The exemplifications set out herein illustrate embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiments in different forms, the figures show, and herein describe in detail, embodiments with the understanding that the present descriptions are to be considered exemplifications of the principles of the disclosure and are not intended to be exhaustive or to limit the disclosure to the details of construction and the arrangements of components set forth in the following description or shown in the figures.

A pivoting tool 20 can be used as part of a system with traditional tooling with a linearly moveable arm or robotic systems with a moveable arm, such as a robotic arm 10, as preferred, which can move on six axes. Unlike a bracket being forced against a mounting surface for welding with pressure, the pivoting tool 20 ensures surface match of the bracket 30 against a mounting surface without significant force or loosening of a tool while allowing for slight height variance. The pivoting tool 20 adjusts for surface change.

Surface gap is avoided with specific matching against a mounting surface, which may vary with heat distortion or other conditions.

Figure 1:
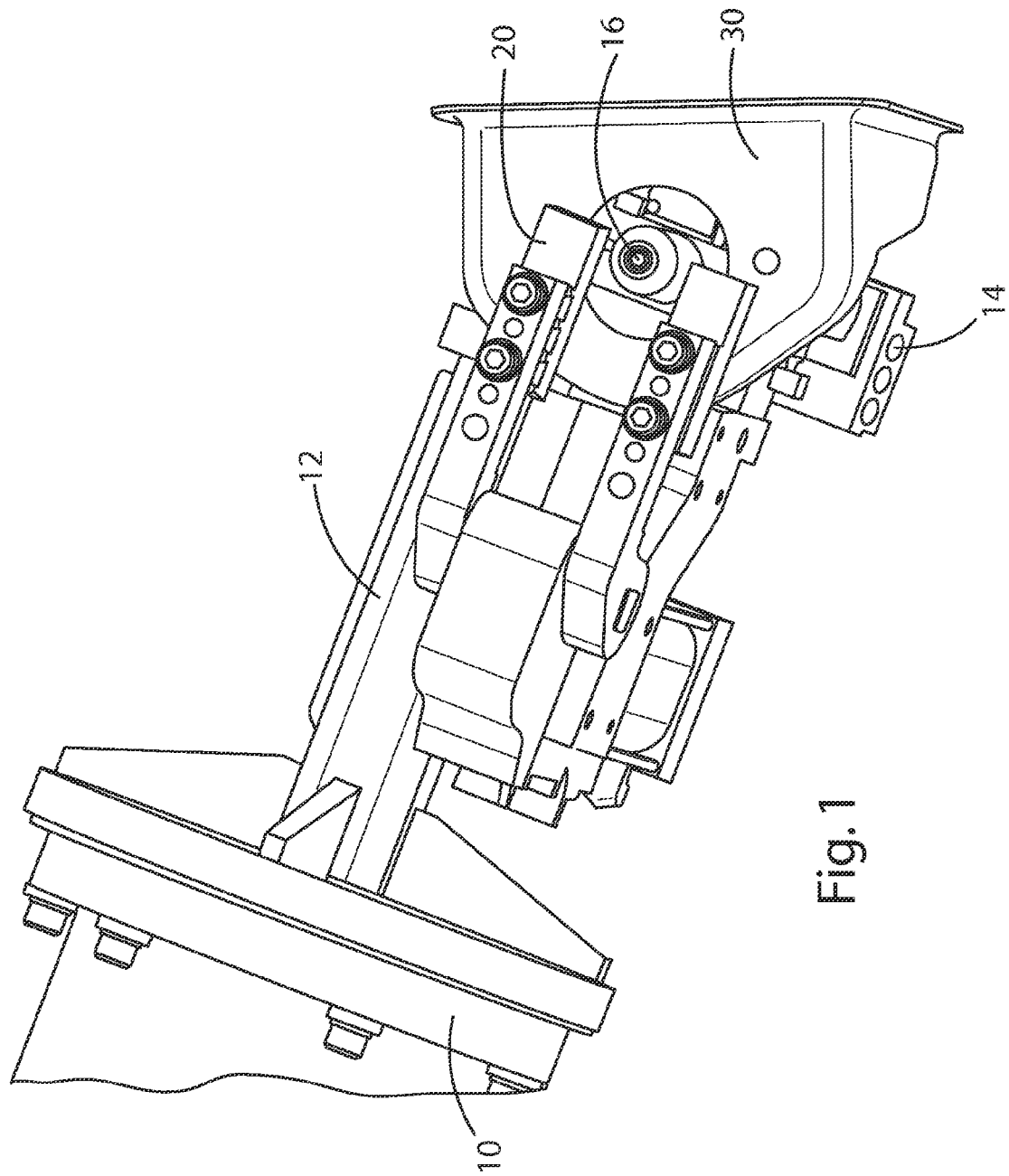
FIG. 1 is a perspective view of the pivoting tool attached to a robotic arm as described in the present disclosure.

As shown in FIG. 1, a pivoting tool 20 attached mechanically to a robotic arm 10 grabs a component, such as a bracket 30, and wherein the pivoting tool 20 allows the bracket 30 to move about or around one or more axis to minimize the surface gap between the bracket 30 and the surface to which the bracket 30 is to be welded, such as a side rail 40. The pivoting tool 20 preferably pivots relative to an appendage 12 or base on the robotic arm 10. In a preferred embodiment, the pivoting tool 20 is characterized by having vision or strength sensors 14 to guarantee that the bracket 30 is positioned at a desired place.

As shown in FIG. 2, the pivoting tool 20 pivots around a pivot pin 16 relative to the appendage 12. The appendage 12 is preferably attached on a distal end of the robotic arm 10, and the appendage 12 allows for precise movement of the bracket 30. The appendage 12 can be adjustable to allow for height variations or slight adjustments, such as by a height adjustor 22 that moves linearly relative to the robotic arm 10. Various vision and strength sensors 14 can observe, detect, perceive and/or determine placement, force and location for adjustment based on preprogrammed code controlling the placement of the bracket 30 relative to the side rail 40 as an example.

FIG. 2 shows the pivoting tool 20 as the portion that pivots around the pivot pin 16 as an example in a detailed component. The pivoting tool 20 has at least one grip 18 that grasps, secures, clamps or otherwise holds the bracket 30 as it can be retrieved from a bracket pool, positioned, held, and welded to a side rail 40. Preferably, a grip 18 holds each side of the bracket 30, depending on the configuration of the bracket 30. The bracket 30 is released from the pivoting tool 20 after it is welded to the side rail 40.

FIG. 3 shows how the bracket 30 can automatically pivot to adjust to surface changes or variations that may be on the surface of the side rail 40 to which the bracket 30 may be welded. In this embodiment, the bracket 30 pivots about an axis of the pivot pin 16 to adjust as needed, as would minimize the space or surface gap between the bracket 30 and a side rail 40 to which it is intended to be welded. The pivoting movement can happen in any axis on other versions of the pivoting tool 20.

The pivoting tool design allows for the bracket 30 to adapt to changes, ensuring surface match with the mounting surface of the side rail 40 through pivoting positioning via the pivoting tool 20 without using substantial force against the mounting surface or loosening of the tooling that allows for height variations or other slight adjustments.

The process of positioning the bracket 30 at the desired position for welding may involve securing the bracket 30, such as taking a bracket 30 from a bracket pool, positioning the bracket 30 close to the desired surface, minimizing the space gap between the bracket 30 and the side rail 40 through pivotal positioning via a pivoting tool 20, preferably by using sensors 14 (i.e. vision and strength), and then welding the bracket 30 to the side rail 40 while the bracket 30 is held in the desired position. Throughout the step of welding, the gap is minimized between bracket 30 and the mounting surface.

In more detail, the process of placement before welding a bracket 30 to a mounting surface includes the pivoting tool 20 securing and positioning the bracket 30 at a desired position close to the mounting surface, minimizing the gap between the bracket 30 and the mounting surface via pivoting of the pivoting tool 20, automated movement of the robotic arm 10, and possible adjustment by an appendage 12 between the pivoting tool 20 and the end of the robotic arm 10.

Figure 4:
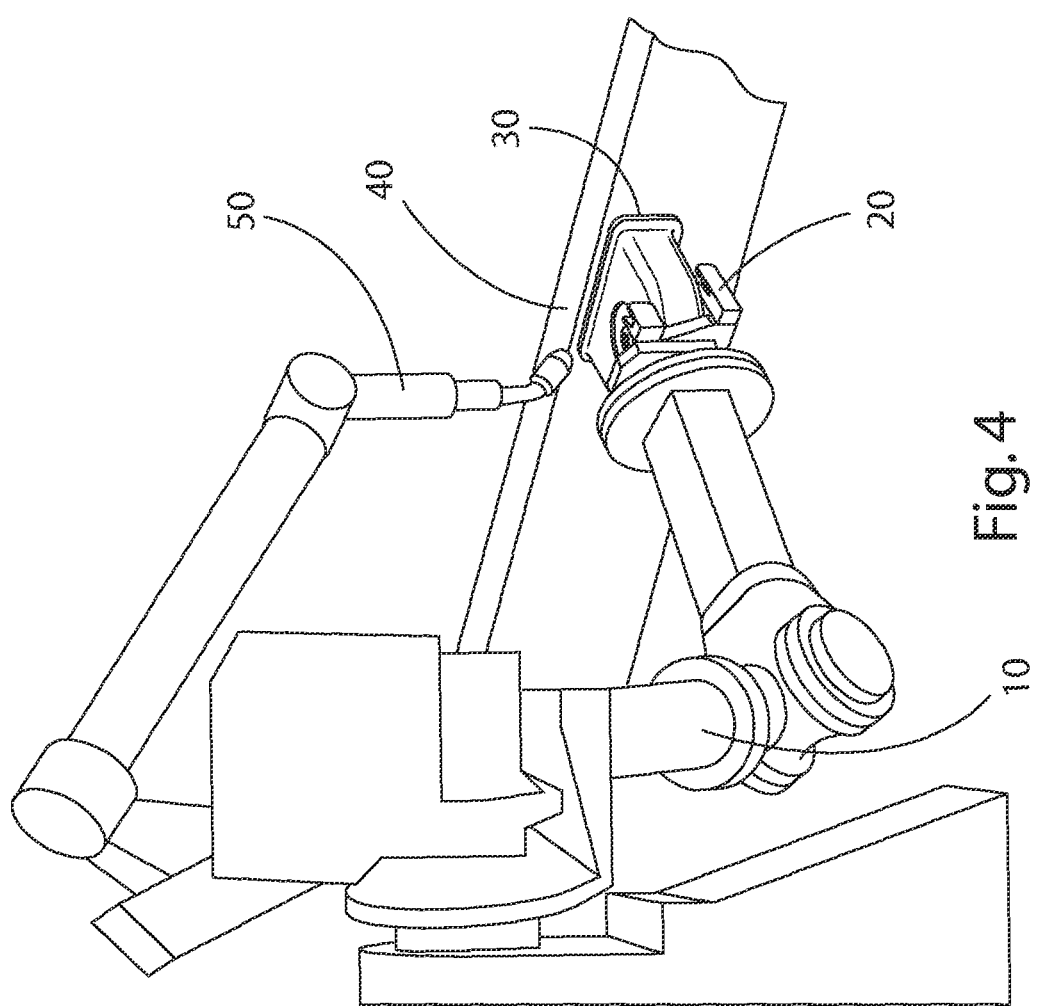
FIG. 4 is a perspective view of the larger system with the robotic arm placing a bracket adjacent to a side rail for welding.

FIG. 4 shows positioning the bracket 30 close to the desired mounting surface of the side rail 40 at an appropriate location to be welded. With a minimal gap between the bracket 30 and the side rail 40, a welder 50, such as a welding robot as shown, is set to weld the bracket 30 to the side rail 40 while the bracket 30 is held in the desired position by the pivoting tool 20 on the robot arm 10.

The positioning and welding system for welding a bracket 30 to a mounting surface uses the pivoting tool 20 on a robotic arm 10 to allow the bracket 30 to pivot to minimize gap between the bracket 30 and its intended mounting surface.

The pivoting tool 20 uses its grip 18 to secure the bracket 30. The robotic arm 10 moves the pivoting tool 20 near the mounting surface. A pivot pin 16 ideally allows the pivoting tool 20 to pivot relative to a preferred appendage 12 on the distal end of the robotic arm 10. The appendage 12 may have a height adjustor 22 to move the bracket 30 linearly relative to the robotic arm 10. The system allows the bracket 30 to move and pivot for a precise surface match with the mounting surface without being forced with substantial pressure against the mounting surface. A welder 50 welds the bracket 30 to the mounting surface with the gap minimized while the bracket 30 is held in the desired position.

Figure 5:
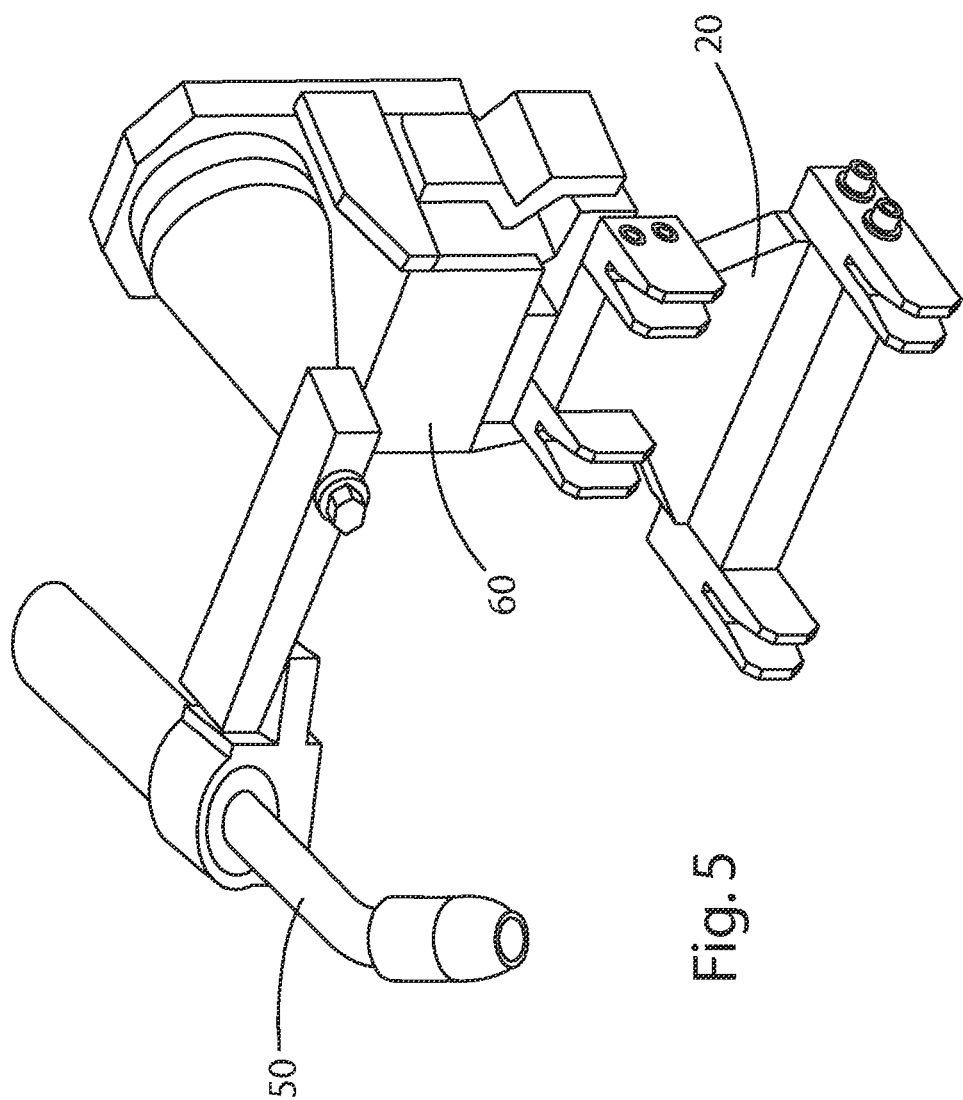
FIG. 5 is a perspective view of a combination end with a bracket loading pivoting tool and a welding robot.

FIG. 5 shows a combination end 60 with both a bracket-loading pivoting tool 20 and a welder 50 incorporated into a single tool adapted to operate on a distal end of the robot arm 10. The welder 50 as the welding robot as shown can move in all directions relative to the base of the combination end 60, and the pivoting tool 20, which would be stationary during welding to hold the bracket 30 in place with the pivoting tool 20. While requiring specialized combination tooling, the robotic arm 10 with the combination end 60 can handle both placement and welding functions to avoid a second robot and require less floor space.

This disclosure has been described as having exemplary embodiments and is intended to cover any variations, uses, or adaptations using its general principles. It is envisioned that those skilled in the art may devise various modifications and equivalents without departing from the spirit and scope of the disclosure as recited in the following claims. Further, this disclosure is intended to cover such variations from the present disclosure as come within the known or customary practice within the art to which it pertains.

What is claimed is:

1. A system for welding a bracket to a mounting surface, the system comprising:
   a robotic arm having a distal end;
   a pivoting tool mounted at the distal end of the robotic arm to pivot freely;
   a grip provided on the pivoting tool and operable to hold a bracket; and
   a welder for securing the bracket to a mounting surface;
   wherein the pivoting tool passively pivots the bracket as a surface of the bracket contacts the mounting surface to automatically match the surface of the bracket to the mounting surface to reduce or eliminate a gap therebetween;
   wherein the welder is a welding robot also mounted on the robotic arm as a combination end on the distal end of the robotic arm, and the welding robot can move in all directions relative to the pivoting tool.

2. The system of claim 1 further comprising a sensor that observes, detects, perceives or determines placement of the bracket.

3. The system of claim 2 wherein the sensor is a vision sensor.

4. The system of claim 1 wherein the pivoting tool is stationary during welding to hold the bracket in place.

5. The system of claim 1 adapted for manufacturing a vehicle side rail with the bracket welded on a portion of the side rail using the pivoting tool and the welder, wherein the pivoting tool via pivoting positioning minimizes the gap between the bracket and the side rail.

6. The system of claim 1 further comprising a pivot pin allowing the pivoting tool to pivot relative to the distal end of the robotic arm.

* * * * *